C. T. HARNED.
SIGNALING DEVICE FOR VEHICLES.
APPLICATION FILED OCT. 29, 1915.
1,222,862.  Patented Apr. 17, 1917.
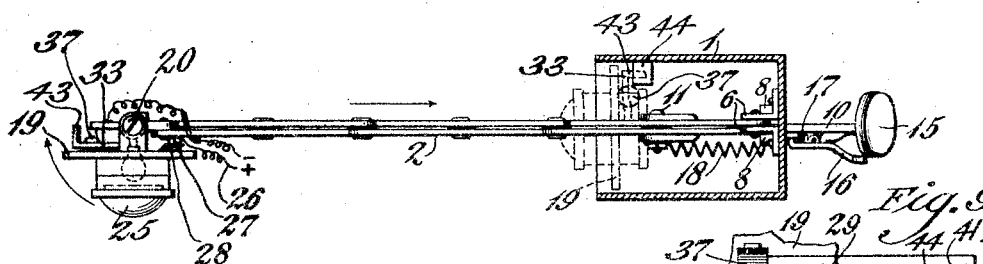
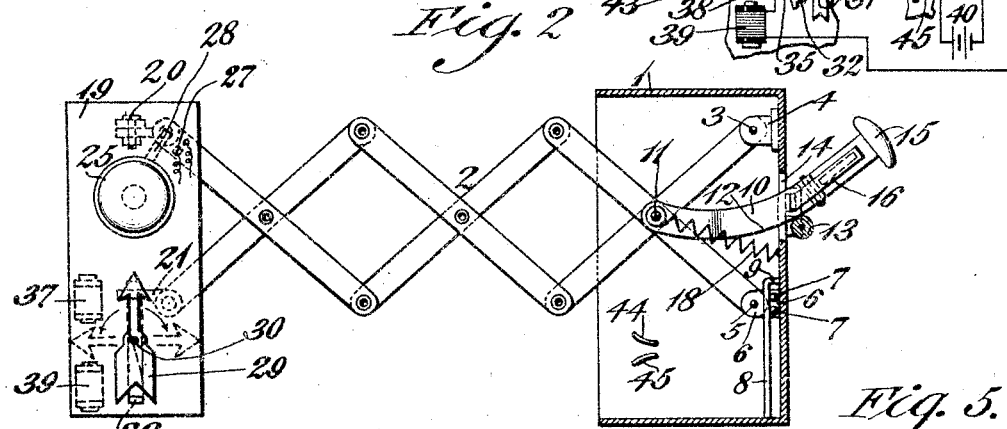
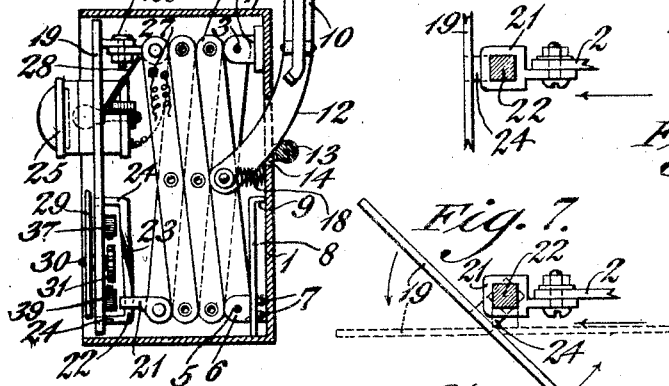
WITNESSES
INVENTOR
Charles T. Harned
BY
Diederich + Fairbank
ATTORNEYS

UNITED STATES PATENT OFFICE.

CHARLES T. HARNED, OF PALMYRA, NEW JERSEY.

SIGNALING DEVICE FOR VEHICLES.

1,222,862.  Specification of Letters Patent.  Patented Apr. 17, 1917.

Application filed October 29, 1915. Serial No. 58,531.

*To all whom it may concern:*

Be it known that I, CHARLES T. HARNED, a citizen of the United States, residing in Palmyra, county of Burlington, State of New Jersey, have invented a new and useful Signaling Device for Vehicles, of which the following is a specification.

My present invention consists of a novel signaling device for vehicles which is adapted to be employed with any desired type of vehicle and especially with motor driven vehicles, such as automobiles, in order that the automobiles in rear of the machine on which the signaling device is installed may readily see the signal which has been made and thus have knowledge of the direction in which the front automobile is to travel.

It further consists of a novel signaling device, the parts of which are normally inclosed in a casing mounted on the vehicle at a point accessible to the driver, and wherein novel means are provided for turning the signaling mechanism when such parts reach the limit of their outward travel.

It further consists of a novel construction and arrangement of an indicating arm and novel means for actuating the same.

Other novel features of construction and advantage will hereinafter more clearly appear in the detailed description.

For the purpose of illustrating my invention, I have shown in the accompanying drawings one form thereof which is at present preferred by me, since the same will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a sectional plan view of a signaling device for automobiles embodying my invention, the parts being shown in extended position.

Fig. 2 represents a sectional elevation of the construction seen in Fig. 1.

Fig. 3 represents a sectional elevation of my device, showing the parts in closed position.

Fig. 4 represents a sectional view of a portion of the device seen in Fig. 3.

Fig. 5 represents a sectional elevation of a portion of the device showing the manner in which the same may be operated by the foot.

Fig. 6 represents, in perspective, a sectional view of a portion of the device, certain parts being removed for the sake of clearness of illustration.

Fig. 7 represents a sectional view, showing the manner in which the signaling members are turned.

Fig. 8 represents a side elevation of a turning device employed when it is desired to turn the signaling members in the opposite direction to that seen in Figs. 1 and 2.

Fig. 9 represents a diagrammatic view of the wiring.

Similar numerals of reference indicate corresponding parts in the figures.

Referring to the drawings:—

1 designates a casing of a signaling device embodying my invention, and as will be apparent, the contour of said casing may vary in accordance with the conditions and requirements met with in practice. The casing is adapted to be connected with the coöperating parts of the vehicle body in any desired manner. 2 designates a lazy tongs which is normally contained within the casing 1, and one of its rear levers is pivotally connected at 3 to a bracket 4 secured to the casing 1. The free end of the other rear lever of the lazy tongs is pivotally connected at 5 to a shoe 6, which is provided with the pins or lugs 7 which travel in rear of the guide members 8, as will be understood by reference to Figs. 2, 3 and 6. The guide members 8, in the present instance, extend from the bottom of the casing and at their upper ends are laterally deflected, as at 9, and connected with the casing in any desired manner in order to form a stop to limit the outward movement of the lazy tongs 2.

10 designates a lever connected with the lazy tongs 2 at the pivotal point 11 of the rear levers of the lazy tongs and provided with a curved face 12, which is adapted to travel on a roller 13 carried by the casing. As best seen in Figs. 2 and 3, the lever 10 passes through an aperture 14 in the rear of the casing and its outer end is provided with a head 15 with which the hand of the operator is adapted to contact. 16 designates a pawl pivoted to the lever 10 and adapted to engage a catch 17 carried by the casing 1 in order to lock the parts in their operative and inoperative positions. In order to return the lazy tongs 2 to its inoperative position, a tension device 18 is provided, which may be of any desired construction, and in the form illustrated, it consists of a spring, one end of which is connected to the pivot of the rear levers of the lazy tongs while its opposite end is connected to the casing 1. An end face of the casing 1 is open and provided with a closure 19 which is carried by the lazy tongs. The upper end of the front lever of the lazy tongs is pivotally connected at 20 with the closure 19, while the lower end thereof is provided with a shoe 21 pivoted thereto and adapted to slide on a turning member 22 which effects the partial rotation of the closure 19 as it reaches the limit of its forward travel and returns said closure 19 to its normal position on its rearward movement.

The means illustrated to accomplish this result comprises a rectangular rod which is distorted longitudinally as at 23, and on which the shoe 21 is adapted to slide, said shoe being provided with a rectangular-shaped aperture. The turning member 22 has its free ends deflected, as at 24, and said ends are connected with the closure 19 in any desired manner. 25 designates a light or lamp which forms a signal, and one conductor, such as 26, is connected with a contact 27 carried by the lazy tongs 2, and a spring contact 28 is provided which is connected with the other terminal of the light, so that when the parts are in the position seen in Fig. 1, the contacts 27 and 28 will be in engagement and the lamp 25 will be lighted.

I also preferably mount on the closure 19 an arm or pointer which indicates the direction which the vehicle is to take and this arm is illustrated as comprising an arrow 29 mounted on a shaft 30 extending through the closure 19 and provided with a pinion 31, with which the segment 32 meshes. The segment 32 forms one end of a lever 33 which is pivotally supported at 35, and the opposite end of said lever is provided with the armature 36 coöperating with the electro-magnet 37, and the armature 38 coöperating with the electro-magnet 39. The electro-magnet 37 is connected with a source of electric supply 40, by means of a push-button 41, and the magnet 39 is connected with the same source of electric supply by means of a push-button 42. The lever 33 is provided with a projection 43, which coöperates with the guide 44 or the guide 45 to return the arrow 29 to its normal position, as will be hereinafter explained.

Instead of operating the lazy tongs by the hand, it is also within the scope of my invention to provide a lever 46 corresponding to the lever 10 and connected by a cable 47 with a foot-operated plunger, or its equivalent, 48. The terminals of the lamp 25 may be connected with the battery or any other source of electric supply carried by the vehicle, and this is also true of the circuits for the electro-magnets 37 and 39.

The operation of my novel signaling device will now be readily apparent to those skilled in this art, and is as follows:

The casing 1 is connected with the vehicle in such a manner that the lever 10 or the foot-operated plunger 48 is in a position accessible to the vehicle driver, and the push buttons 41 and 42 are also located in a position accessible to the driver. When it is intended to stop the machine and the driver wishes to signal to the machines in rear of him that it is his intention to stop, he presses down with his hand on the lever 10, thereby causing the lazy tongs 2 to move outwardly from the side of the car and during such movement, owing to the provision of the turning member 22, the closure 19 will be turned a quarter turn to the right or to the left, depending upon whether the device is constructed for a right or left hand arrangement of the steering mechanism of the automobile. In the form shown in Figs. 1 to 3 inclusive, the parts are arranged for a left hand arrangement of the automobile steering mechanism, so that the closure 19 is turned to the left, and the outer face of the closure is preferably colored red.

As the closure 19 turns at substantially right angles to the normal direction of its travel, owing to the provision and arrangement of the contacts 27 and 28, the circuit for the light 25 will be closed, and this light, which is preferably colored red, will be lighted. The contact arm 28, if desired, may be pivotally supported so that it may be swung out of register with the contact 27 in case it is not desired to have the lamp lighted during the day-time. If the driver of the vehicle desires to turn a corner and to indicate the direction in which he is to go, he presses the button 41 or 42 in accordance with the desired direction, thereby energizing the electro-magnet 37 or 39. This will move the lever 33 to cause the arrow 29 to be turned in the proper direction. The pawl 16 interlocks with the catch 17 and maintains the parts in their extended position. When it is desired to return the parts to their normal position, the driver releases the pawl 16 and the tension device 18 returns the parts to the position seen in Fig. 3. During this movement, the closure 19 receives a quarter turn and the contacts 27 and 28 open the circuit for the lamp 25. As the closure 19 returns to the position seen in Fig. 3, the projection 43 on the lever 33 will engage either the guide 44 or the guide 45, depending upon the direction in which the arrow 29 has been turned, and the lever 33 will be returned to its normal position seen in Fig. 9, at which time the arrow is in the position seen in Fig. 2.

If it is desired to operate the signaling device by the foot, the operator presses his foot on the plunger 48 and the operation takes place in the manner already set forth.

It will be apparent from the foregoing that in accordance with my present invention, I provide novel means for signaling the direction which the driver of the vehicle is to take and also his intention to stop or slow down the vehicle.

In the construction illustrated, I employ a sectional casing, one section of which forms a signal, and novel means are provided to effect relative movement of the casing sections.

In accordance with my invention, one of the casing sections forms a closure for the other section and the movable member of the device is connected with the lazy tongs in such a manner that it is partially rotated, so that the signal can readily be seen by drivers of the automobiles in rear of the automobile carrying the signal.

It will now be apparent that I have devised a novel and useful signaling device for vehicles, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a signaling device, a sectional casing, one section of which forms a signal, means to effect relative movement of said sections, and devices common to the signal forming casing section and said means to cause the signal forming section to be partially rotated as it reaches the limit of its forward travel, said means forming the only connection between the sections of said casing.

2. In a signaling device, a casing, a lazy tongs normally concealed within said casing and connected therewith, a closure for said casing forming a signal and to which one front lever of the lazy tongs is connected, a shoe carried by the other front lever of the lazy tongs, and a rod carried by said closure and on which said shoe slides, said rod and shoe coöperating to partially rotate said closure during the movement of said lazy tongs.

3. In a signaling device, a casing, a lazy tongs concealed within the casing and having one rear lever pivotally connected with the casing, a shoe connected with the other rear lever, a guide for said shoe, a closure for said casing forming a signal, one front lever of the lazy tongs being connected to said closure, and means common to the other front lever of the lazy tongs and to said closure to cause the closure to be partially rotated during the movement of said lazy tongs.

4. In a signaling device, a casing, a lazy tongs having one rear lever connected with the casing, a shoe connected with the other rear lever of the lazy tongs, a guide for said shoe, a signal forming closure for the casing connected with a front lever of the lazy tongs, a shoe carried by the other front lever of the lazy tongs, and a longitudinally distorted rod carried by said closure and engaging said last-named shoe.

5. In a signaling device, a casing, a lazy tongs concealed within the casing and having one rear lever pivotally connected with the casing, a shoe connected with the other rear lever, a guide for said shoe, a closure for said casing forming a signal, one front lever of the lazy tongs being connected to said closure, means common to the other front lever of the lazy tongs and to said closure to cause the closure to be partially rotated during the movement of said lazy tongs, and an actuating lever connected with said lazy tongs and extending exteriorly of the casing.

6. In a signaling device, a casing, a lazy tongs concealed within the casing and having one rear lever pivotally connected with the casing, a shoe connected with the other rear lever, a guide for said shoe, a closure for said casing forming a signal, one front lever of the lazy tongs being connected to said closure, means common to the other front lever of the lazy tongs and to said closure to cause the closure to be partially rotated during the movement of said lazy tongs, an actuating lever connected with said lazy tongs and extending exteriorly of the casing, and an antifriction member on which said actuating lever is fulcrumed.

CHARLES T. HARNED.

Witnesses:
H. S. FAIRBANKS,
C. D. McVAY.